(12) United States Patent
Brown et al.

(10) Patent No.: US 10,526,685 B2
(45) Date of Patent: Jan. 7, 2020

(54) HEAP LEACHING

(71) Applicant: Technological Resources Pty. Limited, Melbourne, Victoria (AU)

(72) Inventors: Paul Leslie Brown, Kiama (AU); Ralph Peter Hackl, Mount Eliza (AU); Stephen Charles Grocott, North Warrandyte (AU)

(73) Assignee: Technological Resources Pty. Limited, Melbourne, Victoria (AU)

( * ) Notice: Subject to any disclaimer, the term of this patent is extended or adjusted under 35 U.S.C. 154(b) by 0 days.

(21) Appl. No.: 16/154,276

(22) Filed: Oct. 8, 2018

(65) Prior Publication Data

US 2019/0055624 A1 Feb. 21, 2019

Related U.S. Application Data

(63) Continuation of application No. 15/772,296, filed as application No. PCT/AU2016/051024 on Oct. 28, 2016.

(30) Foreign Application Priority Data

Oct. 30, 2015 (AU) ................. 2015904452

(51) Int. Cl.
*C22B 15/00* (2006.01)
*C22B 3/08* (2006.01)
*C22B 1/14* (2006.01)
*C22B 3/04* (2006.01)
*C22B 3/06* (2006.01)

(52) U.S. Cl.
CPC ............ *C22B 15/0071* (2013.01); *C22B 1/14* (2013.01); *C22B 3/04* (2013.01); *C22B 3/06* (2013.01); *C22B 3/08* (2013.01); *C22B 15/0008* (2013.01); *C22B 15/0065* (2013.01); *C22B 15/0067* (2013.01)

(58) Field of Classification Search
CPC .... C22B 3/04; C22B 3/06; C22B 3/08; C22B 15/0065; C22B 15/0067; C22B 1/14; C22B 15/0071; C22B 15/0008
See application file for complete search history.

(56) References Cited

U.S. PATENT DOCUMENTS 3,260,593 A 7/1966 Zimmerley et al.
3,475,163 A 10/1969 Watson et al.
(Continued)

FOREIGN PATENT DOCUMENTS

AU 78560/98 A 2/1999
AU 749366 * 2/1999
(Continued)

OTHER PUBLICATIONS

Srinath, E. G.; Sridhar, M. K. C.; Pillai, S. C. "Bacterial Leaching of Copper from Low Grade Chalcopyrite Ores." Journal of the Indian Institute of Science. vol. 58, No. 12 pp. 567-576. (Year: 1976).*

(Continued)

*Primary Examiner* — Tima M. McGurthy-Banks
(74) *Attorney, Agent, or Firm* — Banner & Witcoff, Ltd.

(57) ABSTRACT

A method of leaching chalcopyrite ores includes the steps of forming agglomerates of fragments of chalcopyrite ores and silver and leaching the agglomerates with suitable leach liquor.

23 Claims, 5 Drawing Sheets

(56) References Cited

U.S. PATENT DOCUMENTS

| | | | |
|---|---|---|---|
| 3,856,913 A | 12/1974 | McElroy et al. | |
| 4,571,387 A | 2/1986 | Bruynesteyn et al. | |
| 5,074,993 A | 12/1991 | Kerr et al. | |
| 5,411,148 A | 5/1995 | Kelebek et al. | |
| 5,462,720 A | 10/1995 | Aragones | |
| 6,277,341 B1 * | 8/2001 | Pinches | C22B 3/08 423/27 |
| 7,004,326 B1 | 2/2006 | Dai et al. | |
| 2010/0018349 A1 | 1/2010 | Manabe | |
| 2015/0361523 A1 | 12/2015 | Schuffer Ameller | |
| 2016/0258036 A1 * | 9/2016 | Rautenbach | C22B 15/0067 |
| 2016/0298248 A1 | 10/2016 | Hymer | |

FOREIGN PATENT DOCUMENTS

| | | |
|---|---|---|
| AU | 749366 B2 | 6/2002 |
| CN | 107164633 A | 9/2017 |
| WO | 98/08585 A1 | 3/1998 |
| WO | 2000/037690 A1 | 6/2000 |
| WO | 02/099144 A1 | 12/2002 |
| WO | 2012/031317 A1 | 3/2012 |
| WO | 2014/205481 A1 | 12/2014 |
| WO | 2015/081372 A2 | 6/2015 |

OTHER PUBLICATIONS

Jan. 23, 2017—International Search Report and Written Opinion of PCT/AU2016/051024.
Nov. 26, 2015—International-Type Search Report of AU 2015904452.
Feb. 14, 2018—International Preliminary Report on Patentability of PCT/AU2016/051024.
Cordoba, E.M. et al., "Comparative kinetic study of the silver-catalyzed chalcopyrite leaching at 35 and 68° C", International Journal of Mineral Processing, vol. 92, No. 3-4, 2009 pp. 137-143.
Hiroyoshi, N., et al., "A new reaction model for the catalytic effect of silver ions on chalcopyrite leaching in sulfuric acide solutions", Hydrometallurgy, vol. 63, No. 3, 2002, pp. 257-467.
Munoz, J.A., et al., "Silver catalyzed bioleaching of low-grade copper ores. Part III: Column reactors"<Hydrometallurgy, vol. 88, No. 1-4, 2007, pp. 35-51.
Jun. 20, 2018—(AU) International-Type Search Report and Written Opinion—Australian App 2018901583.
Zhigang Yin et al., "Separation of Molybdenite from Chalcopyrite in the Presence of Novel Depressant 4-Amino-3-thioxo-3,4-dihydro-1,2,4-triazin-5(2H)-one", Minerals 2007, vol. 7, No. 8: 146.
May 20, 2019—(WO) International Search Report and Written Opinion—App PCT/AU2019/050383.
Chen, Yu-Wei; Yuerong Li, Mei-Fang Cai, Nelson Belzile & Zhi Dang, "Preventing oxidation of iron sulfide materials by polyethylene polyamines." Minerals Engineering 19, pp. 19-27 (Year 2006).
Jager, Michael et al, "Branched and linear poly(ethylene imine)-based conjugates: synthetic modification, characterization, and application", Chem. Soc. Rev., 2012, 41, pp. 4755-4767.
May 17, 2018—International Search Report and Written Opinion of the International Searching Authority in PCT/AU2018/050316.
Feb. 22, 2019—(WO) International Preliminary Report on Patentability—App PCT/AU2018/050316.
Mar. 22, 2019—(CL) Opposition to Patent Application—App 201803313.
Lu, Z.Y., Jeffrey, M.I. and Lawson, F., "The effect of chloride ions on the dissolution of chalcopyrite in acidic solutions," Hydrometallurgy, Year 2000, 56 pages 189-202.
Watling, H.R., "The bioleaching of sulphide minerals with emphasis on copper sulphides—A review." Hydrometallurgy 84, pp. 81-108 (Year: 2006).
Herreros, O., et al. "Leaching of Copper Concentrates Using NaCL and Soluble Copper Contributed by the Concentrate Itself", Rev. Metal Madrid 41 (2005), pp. 384-392.

* cited by examiner

HEAP LEACHING

CROSS-REFERENCE TO RELATED APPLICATIONS

The present application is a continuation of U.S. application Ser. No. 15/772,296, filed Apr. 30, 2018, which is a U.S. National Phase filing of International Application No. PCT/AU2016/051024, filed on Oct. 28, 2016, and claiming priority to Australian Patent Application No. 2015904452 filed Oct. 30, 2015. The present application claims priority to and the benefit of all the above-identified applications, which are all incorporated by reference herein in their entireties.

TECHNICAL FIELD

The present invention relates to leaching sulfidic ores that contain chalcopyrite ($CuFeS_2$), hereinafter referred to as "chalcopyrite ores".

The present invention relates to leaching chalcopyrite ores that also contain other copper minerals.

The present invention relates to a method of forming agglomerates of fragments of chalcopyrite ores that are suitable for use in a heap or other leaching operations.

The present invention relates to agglomerates of fragments of chalcopyrite that are suitable for use in a heap or other leaching operations.

The present invention relates particularly to a method of heap leaching agglomerates of fragments of chalcopyrite ores.

The present invention relates particularly to a method of bioleaching agglomerates of fragments of chalcopyrite ores in a heap via the use of microorganisms.

BACKGROUND ART

In conventional heap leaching of copper sulfide containing minerals (including chalcopyrite ores), mined ore is stacked into heaps, aerated through direct injection of air via aeration pipes extending into the heap and/or by natural convection through exposed areas of the heap, and irrigated with an acid solution for extraction of copper into solution. The copper is subsequently recovered from the acid solution by a range of recovery options including solvent extraction and electrowinning (SX/EW), cementation onto more active metals such as iron, hydrogen reduction, and direct electrowinning. The acid solution is regenerated and recycled through the heap to leach more copper from the ore in the heap. The ore in the heap may comprise agglomerates of fragments of ore. Leaching may be assisted by the use of microorganisms.

Generally, heap and dump leaching (hereinafter collectively referred to as "heap leaching") provide lower metal recoveries than other metallurgical process options for recovering copper from copper-containing ores, such as milling and flotation that produces copper-containing concentrates that are then smelted to produce copper metal.

Consequently, heap leaching tends to be reserved for lower grade ore types that have at least a proportion of readily recovered copper, but where crushing/milling costs per unit of copper (or copper equivalent—i.e. when taking into account by-product credits from, for example, gold and silver) are too high to support a concentrator approach, or where mineral liberation and other characteristics (e.g. arsenic content) will not support production of directly useable or saleable concentrates.

Standard best industry practice is to use agglomerates of mined and thereafter crushed ore fragments in heaps. Typically, the mined ore is processed through multiple crushing steps, namely primary and secondary crushing steps, and in some instances tertiary crushing steps, and the crushed ore fragments are agglomerated in an agglomeration step, typically with the use of an acid.

The invention is concerned particularly with leaching mined and crushed and agglomerated ore fragments that contain chalcopyrite.

It is known that it is difficult to leach more than 20-40 wt. % of copper from chalcopyrite. The low copper recovery is often thought to be associated with the formation of a passive film on the surface of chalcopyrite.

The invention makes it possible to achieve higher recoveries of copper from chalcopyrite in ore fragments.

The above description is not to be taken as an admission of the common general knowledge in Australia or elsewhere.

SUMMARY OF THE DISCLOSURE

The applicant, through a group company, has carried out research and development work on leaching chalcopyrite ores, and has made a number of findings in the course of this leaching work.

The present invention is an outcome of those findings.

In general terms, the applicant has found that it is possible to achieve high levels (greater than 60 wt. %) of recovery of copper by leaching agglomerates of fragments of chalcopyrite ores (and ores containing other copper-containing minerals) that have silver dispersed in the agglomerates by adding silver to mined ore fragments prior to, or during, agglomeration of the ore fragments or adding silver to agglomerates of the ore fragments.

In particular, the applicant has found that low concentrations of silver, typically less than 2 g silver per kg copper in the chalcopyrite ores, dispersed on the surfaces of chalcopyrite in agglomerates makes it possible to achieve higher recoveries (greater than 60%) of copper from the ores in shorter leaching times compared to leaching agglomerates that do not have silver dispersed in the agglomerates. This is a significant finding, particularly in the context of leaching lower grade chalcopyrite ores, i.e. ores containing less than 1.25 wt. % copper, typically less than 1 wt. % copper.

The reason(s) for the effectiveness of silver dispersed on the surfaces of chalcopyrite in agglomerates of fragments of chalcopyrite ores, particularly in low concentrations, have not been fully established completely by the applicant. In any event, the invention provides an opportunity for heap leaching, including microorganism-assisted heap leaching of silver-containing agglomerates of fragments of chalcopyrite ores at relatively low heap temperatures at comparatively low operating costs with high recoveries.

In broad terms, the invention relates to providing silver in a form and within a defined concentration range at a location of a copper-containing ore that successfully catalyses leaching of copper from the copper-containing ore, particularly chalcopyrite.

In the case of chalcopyrite ores, the invention relates to dispersing silver in a form and within a defined concentration range on the surface of chalcopyrite.

Typically, the defined concentration range is less than 2 g Ag/kg Cu.

Naturally-occurring silver in copper-containing ores may or may not have catalyst properties for copper leaching. Naturally-occurring silver may be in one or more of a number of forms in copper-containing ores, including but not limited to native silver, argentite ($Ag_2S$), chlorargyrite (AgCl), as inclusions of native silver in copper minerals and pyrite, and as silver sulfosalts such as tetrahedrite ($Cu,Fe,Zn,Ag_{12}Sb_4S_{13}$), pyragyrite ($Ag_3SbS_3$) and proustite ($Ag_3AsS_3$).

Where there is naturally-occurring silver that has catalyst properties for copper leaching, an operator may take this into account and select a lower concentration of added silver than would otherwise be the case.

The invention provides a method of leaching mined chalcopyrite ores that includes the steps of:

(a) forming agglomerates of fragments of chalcopyrite ores and silver; and (b) leaching the agglomerates with suitable leach liquor.

The term "chalcopyrite ores" is understood herein to mean ores that contain chalcopyrite. The ores may also contain other copper-containing minerals. The ores may also contain pyrite.

The term "fragment" is understood herein to mean any suitable size of mined or treated (e.g. crushed) material having regard to materials handling and processing capabilities of the apparatus used to carry out the method. It is also noted that the term "fragment" as used herein may be understood by some persons skilled in the art to be better described as "particles". The intention is to use both terms as synonyms.

The term "mined" ore is understood herein to include, but is not limited to, (a) run-of-mine material and (b) run-of-mine material that has been subjected to at least primary crushing or similar or further size reduction after the material has been mined and prior to being sorted. The term "mined" material also includes mined material that is in stockpiles.

Agglomeration step (a) may include forming agglomerates by mixing together ore fragments and silver in an agglomeration step.

Agglomeration step (a) may include forming agglomerates by adding silver to ore fragments and then mixing together ore fragments in an agglomeration step.

Agglomeration step (a) may include forming agglomerates of ore fragments in an agglomeration step and then adding silver to the agglomerates.

The agglomerates formed in agglomeration step (a) may have a low total silver concentration.

As noted above, the fragments in the agglomerates may already have a naturally-occurring low silver concentration before the addition of silver in the agglomeration step (a) and some or all of the native silver may or may not have catalyst properties for copper leaching. In practice, this is a factor to take into account when determining the amount of silver to add during the agglomeration step (a) so that the overall active silver concentration remains within a required concentration range. To distinguish between naturally-occurring silver concentrations in chalcopyrite ores and the silver added during the agglomeration step, the added silver is hereinafter referred to as "added silver" or similar terminology.

The added silver and the total silver concentration in the agglomerates are expressed herein in terms of g silver per kg copper in the ore in the agglomerates. The required concentration of added silver in the agglomeration step to achieve a selected agglomerate silver concentration (naturally-occurring and added) can readily be determined by the skilled person. In addition, it is acknowledged that there are different measures of silver concentration in the patent and non-patent literature and it can be challenging to make comparisons of the different ranges disclosed in the literature. The added silver concentration in the agglomerates may be less than 2 g silver per kg copper in the ore in the agglomerates.

The added silver concentration in the agglomerates may be less than 1 g silver per kg copper in the ore in the agglomerates.

The added silver concentration in the agglomerates may be less than 0.5 g silver per kg copper in the ore in the agglomerates.

The added silver concentration in the agglomerates may be less than 0.4 g silver per kg copper in the ore in the agglomerates.

The added silver concentration in the agglomerates may be less than 0.3 g silver per kg copper in the ore in the agglomerates.

The added silver concentration in the agglomerates may be less than 0.25 g silver per kg copper in the ore in the agglomerates.

The added silver concentration in the agglomerates may be less than 0.125 g silver per kg copper in the ore in the agglomerates.

The added silver concentration in the agglomerates may be less than 0.075 g silver per kg copper in the ore in the agglomerates.

Agglomeration step (a) may include adding silver to the chalcopyrite ore fragments by any suitable means and in any suitable form.

The added silver may be in any suitable form.

The added silver may be in a solid form.

The added silver may be in a solution.

The added silver may be in a solid form that becomes mobile upon dissolution with leach liquor. It may precipitate or otherwise be deposited on the chalcopyrite surface.

Typically, the added silver is added to the ore fragments while the fragments are being mixed together.

Agglomeration step (a) may include dispersing added silver on surfaces of chalcopyrite in chalcopyrite ore fragments.

Agglomeration step (a) may include dispersing added silver within the chalcopyrite ore fragments.

Agglomeration step (a) may include adding silver to the chalcopyrite ore fragments in the form of an aerosol, where the term "aerosol" is understood to mean a colloidal suspension of particles, typically in powder form, in air or gas.

Agglomeration step (a) may include adding silver in solution to the chalcopyrite ore fragments in the form of a mist or a spray, where the terms "mist" and "spray" are understood to mean small droplets of silver solution suspended in air.

The selection of a mist/spray/aerosol as a medium for adding the silver solution to the chalcopyrite ore fragments makes it possible to maximise the delivery of a small concentration of the silver to a substantially larger mass (and large surface area) of chalcopyrite ore fragments. The mist/spray/aerosol approach makes it possible to deliver the silver to a substantial proportion of the chalcopyrite ore fragments.

Typically, agglomeration step (a) may include adding silver to the chalcopyrite ore fragments in the form of a mist or a spray or aerosol while the ore fragments are being mixed.

Typically, agglomeration step (a) includes using a small concentration of silver compared to the amount of chalcopyrite ore fragments.

Agglomeration step (a) may include forming agglomerates by also mixing together an acid, typically sulfuric acid, with the chalcopyrite ore fragments and the silver. The acid may be added at the same time as, or prior to, or after the silver solution. The added acid concentration may be less than 50 kg $H_2SO_4$/dry t ore, typically less than 30 kg $H_2SO_4$/dry t ore, and may be less than 10 kg $H_2SO_4$/dry t ore or less than 5 kg $H_2SO_4$/dry t ore. Typically, the acid concentration is 0.5-10 kg $H_2SO_4$/dry t ore.

Agglomeration step (a) may include forming agglomerates by also mixing microorganisms that can assist leaching of copper with the chalcopyrite ore fragments and the silver. The microorganisms may be added at the same time as, or prior to, or after the silver solution. The microorganisms may be one or more than one of mesophilic or thermophilic (moderate or extreme) bacteria or archaea. The microorganisms may be acidophilic bacteria or archaea. The microorganisms may be thermophilic acidophiles.

Agglomeration step (a) may include simultaneously mixing and agglomerating fragments.

Agglomeration step (a) may include mixing fragments in one step and then agglomerating the mixed fragments in a subsequent step. There may be overlap between the mixing and agglomeration steps.

The fragments of chalcopyrite ores may include fractures to facilitate dispersing silver solution with the fragments.

The added silver may be in an aqueous solution.

The added silver may be in a soluble form.

The added silver may be in an insoluble form or sparingly soluble form such as silver sulfate or silver chloride or silver sulfide. The term "sparingly soluble" is understood herein to mean salts with solubility less than 0.01 moles/litre.

Leaching step (b) may be a heap leaching step.

Leaching step (b) may be a vat leaching step.

Leaching step (b) may be any other leaching step for leaching agglomerates.

Leaching step (b) may include supplying a leach liquor to a heap of agglomerates from agglomeration step (a) and allowing the leach liquor to flow through the heap and leach copper from agglomerates and collecting leach liquor from the heap, processing the leach liquor and recovering copper from the liquor.

The leach liquor may include microorganisms to assist leaching of copper.

The microorganisms may be acidophilic bacteria or archaea.

The microorganisms may be thermophilic acidophiles.

Heap leaching step (b) may include controlling the heap temperature to be less than 75° C., typically less than 65° C., typically less than 60° C., typically less than 55° C., typically less than 50° C., and more typically less than 45° C.

Heap leaching step (b) may include controlling the heap temperature to be at least 10° C., typically at least 20° C., typically at least 30° C., and more typically at least 40° C.

Heap leaching step (b) may include controlling the oxidation potential of the leach liquor during an active leaching phase of the step to be less than 700 mV, typically less than 660 mV, typically 600-660 mV, more typically in a range of 630-660 mV, all potentials being with respect to the standard hydrogen electrode. It is noted that the oxidation potential will change during the heap leaching step (b) and is likely to be higher when much of the copper has been leached and the reference to "active leaching phase" is intended to acknowledge this potential change.

Heap leaching step (b) may include controlling the pH of the leach liquor to be less than 3.2, typically less than 3.0, typically less than 2.0, typically less than 1.8, typically less than 1.5, typically less than 1.2, and typically less than 1.0.

Heap leaching step (b) may include controlling the pH of the leach liquor to be greater than 0.3, typically greater than 0.5.

The method may include reducing the size of the mined ore prior to agglomeration step (a).

By way of example, the method may include crushing the mined ore prior to agglomeration step (a). The mined ore may be crushed using any suitable means.

The method may include crushing mined ore in a primary crushing step prior to agglomeration step (a).

The term "primary crushing" is understood herein to mean crushing ore to a top size of 250 to 150 mm in the case of copper-containing ores where the copper is in the form of sulfides. It is noted that the top size may be different for ores containing different valuable metals.

The method may include crushing mined ore in a primary crushing step and then a secondary and possibly tertiary and possibly quaternary crushing step prior to agglomeration step (a).

The invention also provides a method of agglomerating chalcopyrite ores including forming agglomerates of fragments of chalcopyrite ores by mixing together ore fragments and silver, i.e. added silver.

The added silver may be added to the agglomeration step in any suitable form.

The added silver may be added to the agglomeration step in a solid form.

The added silver may be added to the agglomeration step in solution.

The added silver may be added as a solid form in the agglomeration step that becomes mobile upon dissolution with leach liquor. It may precipitate or otherwise be deposited on the chalcopyrite surface.

The invention also provides agglomerates of fragments of chalcopyrite ores and silver suitable for use in a heap or other leaching process, with the added silver being dispersed through the agglomerates.

The added silver may be dispersed on surfaces of chalcopyrite in chalcopyrite ore fragments.

The added silver may be dispersed within the chalcopyrite ore fragments.

The added silver may be in a soluble form in the agglomerates.

The added silver may be in an insoluble form or sparingly soluble form in the agglomerates.

The agglomerates may have a low total silver concentration, i.e. added and naturally-occurring silver.

The added silver concentration in the agglomerates may be less than 5 g silver per kg copper in the ore in the agglomerates.

The added silver concentration in the agglomerates may be less than 3 g silver per kg copper in the ore in the agglomerates.

The added silver concentration in the agglomerates may be less than 2 g silver per kg copper in the ore in the agglomerates.

The added silver concentration in the agglomerates may be less than 1 g silver per kg copper in the ore in the agglomerates.

The added silver concentration in the agglomerates may be less than 0.5 g silver per kg copper in the ore in the agglomerates.

The added silver concentration in the agglomerates may be less than 0.4 g silver per kg copper in the ore in the agglomerates.

The added silver concentration in the agglomerates may be less than 0.3 g silver per kg copper in the ore in the agglomerates.

The added silver concentration in the agglomerates may be less than 0.25 g silver per kg copper in the ore in the agglomerates.

The added silver concentration in the agglomerates may be less than 0.125 g silver per kg copper in the ore in the agglomerates.

The added silver concentration in the agglomerates may be less than 0.075 g silver per kg copper in the ore in the agglomerates.

The fragments of chalcopyrite ores may have fractures that facilitate dispersing silver, particularly when added as a silver solution, within fragments and agglomerates.

The agglomerates may include an acid.

The agglomerates may include microorganisms that can assist leaching of copper.

The invention also provides a heap of material, with the material including the above-described agglomerates.

The invention also includes a method of heap leaching that includes:

(a) forming a heap of material, with the material including the above-described agglomerates; and (b) leaching valuable metal from the ore in the heap.

Typically, the heap leaching method does not include adding silver to leach liquor before the leach liquor is supplied to the heap during the course of the method.

The method may also include recovering the leached metal as a metal product. Typically, this step includes recovering the leached metal from solution in pregnant leach liquor.

In general terms, the advantages of the invention provide an opportunity for microorganism-assisted heap leaching silver-containing agglomerates of fragments of chalcopyrite ore fragments, particularly low grade ores (i.e. less than 1.25 wt. % copper), at relatively low heap temperatures at comparatively low operating costs with high recoveries.

More specifically, the advantages of the invention include, by way of example only, one or more of the following advantages:

Higher copper extraction from copper minerals, in particular difficult to leach minerals such as chalcopyrite and enargite.

Further to the previous dot point, higher copper recovery and faster leaching under milder conditions.

Leaching chalcopyrite ores as opposed to concentrates of the ores avoids the costs of producing concentrates from ores.

An opportunity to leach at lower temperatures, e.g. <50° C., and avoid temperature control and other problems associated with higher temperature heap leach operations, and avoid the higher capital and operating costs associated with higher temperature heap leach operations.

Further to the previous dot point, the opportunity to leach at lower temperatures opens up the possibility to leach in colder climates where maintaining heap temperature is a factor.

An opportunity to leach lower concentration pyrite ores because the leaching temperature does not have to be as high as was the case previously and not as much heat generation from pyrite oxidation is required. Leaching lower concentration pyrite ores also has the advantages of less acid and sulfate generation and therefore lower overall operating costs.

The use of low concentrations of silver minimises operating costs compared to processes that involve the use of higher concentrations of silver (and therefore higher costs given the cost of silver) and simplifies downstream processing steps.

An opportunity for shorter leach periods to achieve a given copper recovery.

BRIEF DESCRIPTION OF THE DRAWING

The present invention is described further with reference to the accompanying drawings of which.

DESCRIPTION OF EMBODIMENT

Figure 1:
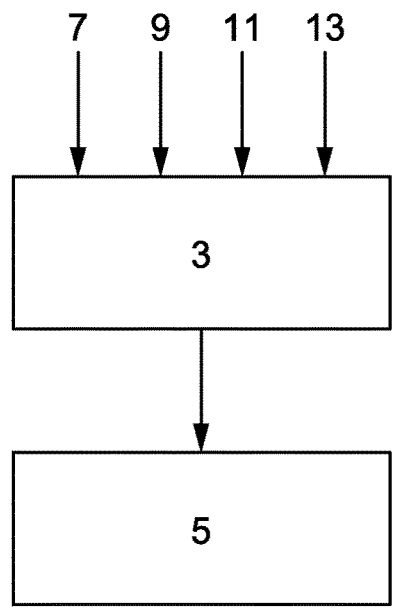
FIG. 1 illustrates the steps in one embodiment of a method of heap leaching agglomerates of fragments of chalcopyrite ores and silver in accordance with the present invention.

With reference to FIG. 1, the following feed materials are transferred to an agglomeration station 3 and are agglomerated as described below:

(a) fragments of chalcopyrite ore that have been crushed to a suitable particle size distribution, identified by the numeral 7 in the Figure;

(b) silver, in this embodiment as a silver solution (but could be in a solid form), typically having an added concentration of silver of less than 5 g silver per kg copper in the ore in the agglomerates, identified by the numeral 9 in the Figure;

(c) an acid, typically sulfuric acid, identified by the numeral 11 in the Figure in any suitable concentration; and (d) microorganisms, identified by the numeral 13 in the Figure, of any suitable type and in any suitable concentration.

The agglomerates produced in the agglomeration station 3 are subsequently used in the construction of a heap 5, and copper in the chalcopyrite and other copper-containing minerals in the agglomerates are leached from the agglomerates in the heap 5 via the supply of a suitable leach liquor, and the leached copper is recovered from the leach liquor in downstream copper recovery steps and the leach liquor is regenerated and recycled to the heap to leach more copper from the chalcopyrite and other copper-containing minerals in the agglomerates in the heap.

The agglomerates produced in the agglomeration station 3 may be transferred directly to a heap construction site. Alternatively, the agglomerates may be stockpiled and used as required for a heap. The agglomeration station 3 and the heap 5 may be in close proximity. However, equally, the agglomeration station 3 and the heap 5 may not be in close proximity.

The method of agglomerating mined ore fragments illustrated in FIG. 1 is suitable for forming agglomerates that can be used in standard heaps. More specifically, the present invention does not extend to particular shapes and sizes of heaps and to particular methods of constructing heaps from the agglomerates and to particular operating steps of the heap leaching processes for the heaps.

By way of example only, the heap may be a heap of the type described in International publication WO2012/031317 in the name of the applicant and the disclosure of the heap construction and leaching process for the heap in the International publication is incorporated herein by cross-reference.

The agglomeration station 3 may be any suitable construction that includes a drum, conveyor (or other device) for mixing the feed materials for the agglomerates and agglomerating the feed materials. Mixing and agglomerating the feed materials for the agglomerates may occur simultaneously. Alternatively, mixing the feed materials may be carried out first and agglomerating (for example initiated by the addition of the acid) may be carried out after mixing has been completed to a required extent. Moreover, the timing of adding and then mixing and agglomerating feed materials may be selected to meet the end-use requirements for the agglomerates. For example, it may be preferable in some situations to start mixing fragments of chalcopyrite ores and then adding silver in a solution or in a solid form of silver, acid, and microorganisms progressively in that order at different start and finish times in the agglomeration step. By way of particular example, it may be preferable in some situations to start mixing fragments of chalcopyrite ores and then adding silver in a solution or in a solid form and acid together, and then adding microorganisms at different start and finish times in the agglomeration step.

The applicant has found that adding silver as a solution in a fine mist or spray or as solid particles in an aerosol to fragments of chalcopyrite ores as the ore fragments are being mixed in a suitable mixer, such as a drum mixer, is a particularly suitable way of achieving a desirable dispersion of silver on the ore fragments.

The selection of a mist/spray/aerosol as a medium for adding silver to the chalcopyrite ore fragments makes it possible to maximise the delivery of a small concentration of the silver to a substantially larger mass (and large surface area) and to a substantial proportion of the chalcopyrite ore fragments.

The work carried out by the applicant indicates that adding silver as a fine mist or spray or aerosol facilitates interaction of silver with surfaces of chalcopyrite minerals within ore fragments. Moreover, the applicant believes at this point that dispersing silver to surfaces of chalcopyrite minerals during the agglomeration process makes it possible to achieve high copper recoveries with very low concentrations of added silver compared to the copper concentrations in chalcopyrite ore fragments, that is, g Ag per kg of Cu in the ore fragments, and the very low mass of added silver compared to the overall mass of the agglomerates of chalcopyrite ore fragments and the other feed materials.

In a situation where the mixing is carried out separately, the mixing may include subjecting fragments to impact forces that cause breaking of at least a portion of the fractured fragments. International application PCT/AU2014/000648 in the name of the applicant describes an apparatus for subjecting fragments to impact forces and the disclosure in the specification of the International application is incorporated herein by cross-reference.

The applicant has carried out column leach testing to investigate the impact on bioleaching, i.e. microorganism assisted leaching, of agglomerates of fragments of chalcopyrite ores where the agglomerates contain low concentrations of silver as part of the agglomerates. The column leach tests are described in Examples 1 and 2 below.

Example 1

A selection of the column tests on the following three different agglomerates are described below and the copper extraction results of the column tests are reported in FIGS. 2-4 and in Table 2 below. The experimental procedure is detailed below and the ore composition provided in Table 1.

1. Experimental Procedure

Ore samples were crushed to <12 mm, with a $P_{80}$ of 9 mm (unless specified otherwise) and around 10 kg of this material was added to an agglomerating drum with water and concentrated acid. In tests with added silver, silver nitrate was dissolved in the water prior to agglomeration, and this was added as a mist, sprayed onto the ore during agglomeration. Once mixed, the agglomerated ore was loaded into 1 m high, 0.1 m diameter columns and allowed to cure for 2-5 days at room temperature before leaching commenced.

During leaching, the temperature of the columns was controlled using a heating jacket and the column was aerated at 0.102 $Nm^3/h/t$. The column was inoculated with ferric ions and sulfur-oxidising microorganisms and the irrigation solution, which can vary from 5-20 g/L ferric iron as ferric sulfate, was pumped into the top of the column through drippers, at 0.079 L/h, and collected at the base of the column.

The pH of the collected leach solution was adjusted to the target of pH 1.2 if required before recycling back to the top of the column.

If the solution copper concentration exceeded 8 g/L, due to copper leaching, the solution was subjected to ion exchange to remove copper and reduce the solution copper concentration to maintain it at less than 8 g/L.

The irrigation solution had a total sulfate concentration of between 20 and 80 g/L at the beginning of the leach. If the total sulfate concentration in solution exceeded 120 g/L, due to leaching of gangue minerals, the solution was diluted to maintain a maximum of 120 g/L sulfate.

The composition of the ore used is shown in Table 1.

TABLE 1

| Ore Composition | | | | | | | | |
|---|---|---|---|---|---|---|---|---|
| Cu (%) | Fe (%) | As (%) | $S_{SO4}$ (%) | $S_T$ (%) | $CuFeS_2$ (%) | CuS (%) | $Cu_2S$ (%) | Cu Arsenides (%) |
| 1.30 | 5.16 | 0.076 | 0.55 | 5.55 | 2.1 | 0.25 | 0.04 | 0.37 |

2. Copper Extraction with and without Added Silver

Column 273—a control column—with no added silver in agglomerates of fragments of chalcopyrite ores.

Column 272—example of the invention—agglomerates of (a) fragments of chalcopyrite ores and (b) 1 g silver added as silver nitrate solution per 1 kg copper in the ore.

Column 288—example of the invention—agglomerates of (a) fragments of chalcopyrite ores and (b) 0.25 g silver added as silver nitrate solution per 1 kg copper in the ore.

The concentrations of chalcopyrite and other copper-containing minerals in the ores in columns 272 and 273 are set out in Table 2. It is evident from Table 2 that chalcopyrite was the main copper-containing mineral and there were also reasonably significant concentrations of chalcocite/digenite/covellite and enargite.

Therefore, having regard to the above, the only significant difference between the agglomerates in the column tests was the silver concentrations.

Figure 2:
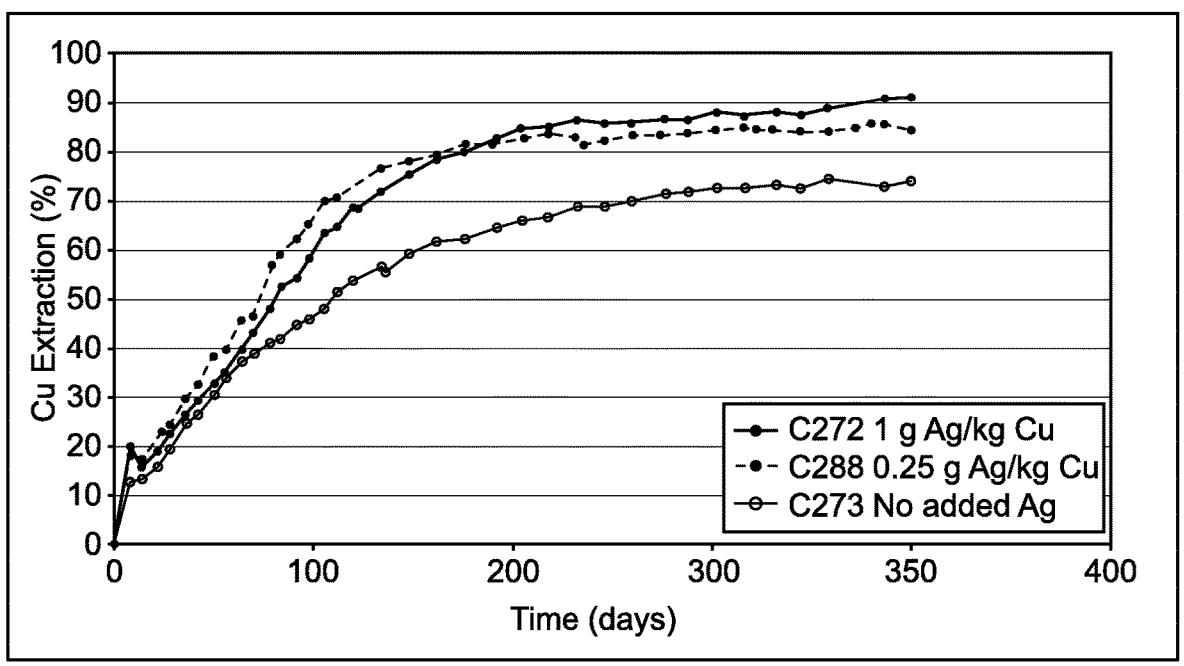
FIG. 2 is a graph of copper extraction versus leaching time for a series of column tests (columns 272, 273, and 288) on agglomerates of fragments of chalcopyrite ores and two different concentrations of silver in accordance with the invention and a comparative example.

FIG. 2 is a graph of copper extraction versus leaching time for columns C272, C273, and C288.

FIG. 2 shows that the addition of low concentrations of silver to the agglomerates of fragments of chalcopyrite ores had a significant impact on (a) copper extraction and (b) the leach times to achieve high copper extractions.

For example, with reference to FIG. 2, it can be seen that after 100 days of leaching (under the same leach conditions), nearly 90% of the copper was leached from the agglomerates in column C288 having 0.25 g silver per kg copper in the agglomerates and only approximately 67% of the copper was leached from the agglomerates in control column C273. It is clear that the low silver concentration in the C288 column had a significant impact on copper extraction. Taking into account the additional cost of the silver, the applicant believes that the use of silver provides a considerable economic benefit.

It is also evident from FIG. 2 that the significant difference in copper extraction after 100 days leach time noted in the preceding paragraph was maintained as the leach time increased to the end of the column tests at 200 days.

It is also evident from FIG. 2 that the leaching rate was faster with the C272 and C288 columns in accordance with the invention compared to that for the control column C273. This finding further reinforces the potential economic advantages arising from the addition of silver to the agglomerates.

Figure 3:
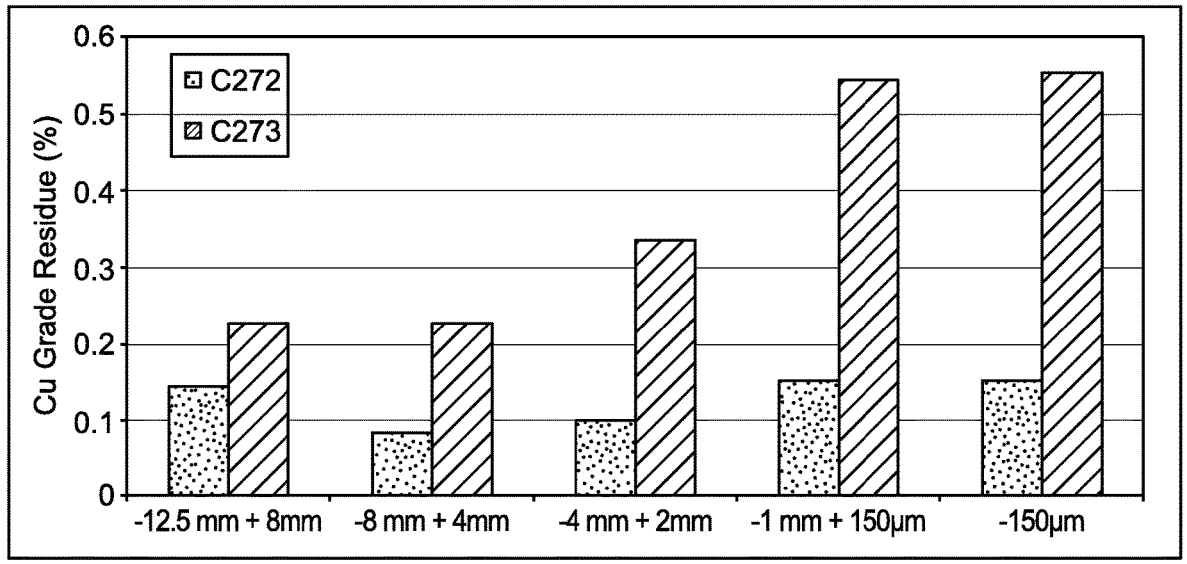
FIG. 3 is a graph of the copper grades for five different size fractions in the leach residues in two of the column tests (columns 272 and 273)
Figure 4:
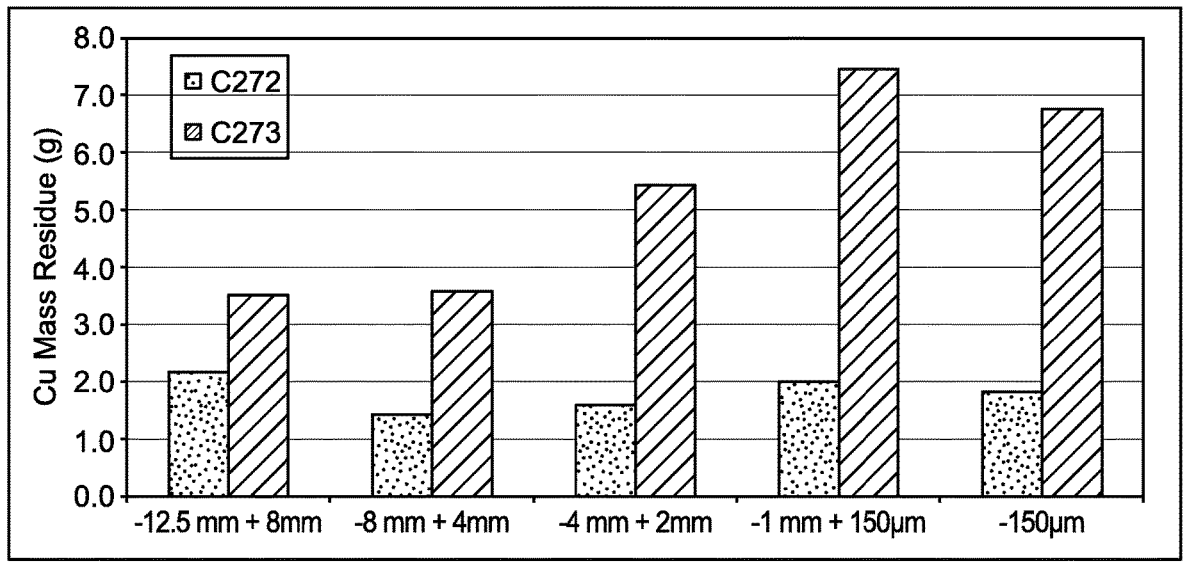
FIG. 4 is a graph of the mass (g) of copper in the five different size fractions in the leach residues in two of the column tests (columns 272 and 273)

FIGS. 3 and 4 provide further data on copper extractions from the agglomerates in column C272 in accordance with the invention and the control column C273.

FIG. 3 provides the copper grades for five different size fractions in the leach residues for columns C272 and C273.

FIG. 4 provides the mass (g) of copper in the five different size fractions in the leach residues for columns C272 and C273.

FIGS. 3 and 4 show that there were significantly lower copper grade and copper mass in each of the column C272 residue size fractions compared to the corresponding control column C273 size fractions, particularly in the finer fractions, i.e. −4 mm.

Finally, Table 2 below compares copper extractions achieved from each of the copper-containing minerals in column C272 in accordance with the invention and control column C273.

The feed ore column in Table 2 shows that only about 60 wt. % of the copper in the feed ore was in the form of chalcopyrite (with a total copper concentration of 1.3 wt. %).

It is evident from Table 2 that silver in the agglomerates made it possible to remove 94.8 wt. % of the copper in the chalcopyrite—compared with only 69.7 wt. % of the copper in the chalcopyrite in the control column C273.

It is also evident from Table 2 that silver also had a beneficial impact on the leaching of other copper-containing minerals, including chalcocite/digenite, enargite and other copper minerals.

TABLE 2

| Copper Mineral | Feed Ore | Residue at the end of Leach Period | | Copper Extraction | |
|---|---|---|---|---|---|
| | | C272 | C273 | C272 | C273 |
| | | Cu Mass (%) | | Cu, % | |
| Chalcocite/Digenite | 0.028 | 0.001 | 0.006 | 95.2 | 79.5 |
| Covellite | 0.167 | 0.001 | 0.004 | 99.4 | 99.5 |
| Cu Oxides | 0.03 | 0.003 | 0.003 | 89.7 | 89.5 |
| Chalcopyrite | 0.712 | 0.055 | 0.212 | 92.6 | 71.5 |
| Enargite | 0.22 | 0.052 | 0.113 | 77.5 | 51.0 |
| Other Cu Minerals | 0.03 | 0.004 | 0.008 | 85.7 | 70.9 |
| Cu Clays | 0.001 | 0.0001 | 0.0001 | 95.5 | 92.7 |

In summary, the column tests reported above show that the addition of silver to agglomerates of fragments of chalcopyrite ores, particularly low concentrations of silver, has a significant positive impact on copper recoveries from chalcopyrite minerals in the agglomerates and leach times.

Example 2

Another selection of the column tests on the different agglomerates are described below and the copper extraction results of the column tests are reported in FIGS. 5-9 and in Table 3 below. The composition of the ore used for these tests is shown in Table 1 and the experimental procedure for these tests is as described in Example 1.

1. Silver Dosage

Figure 5:
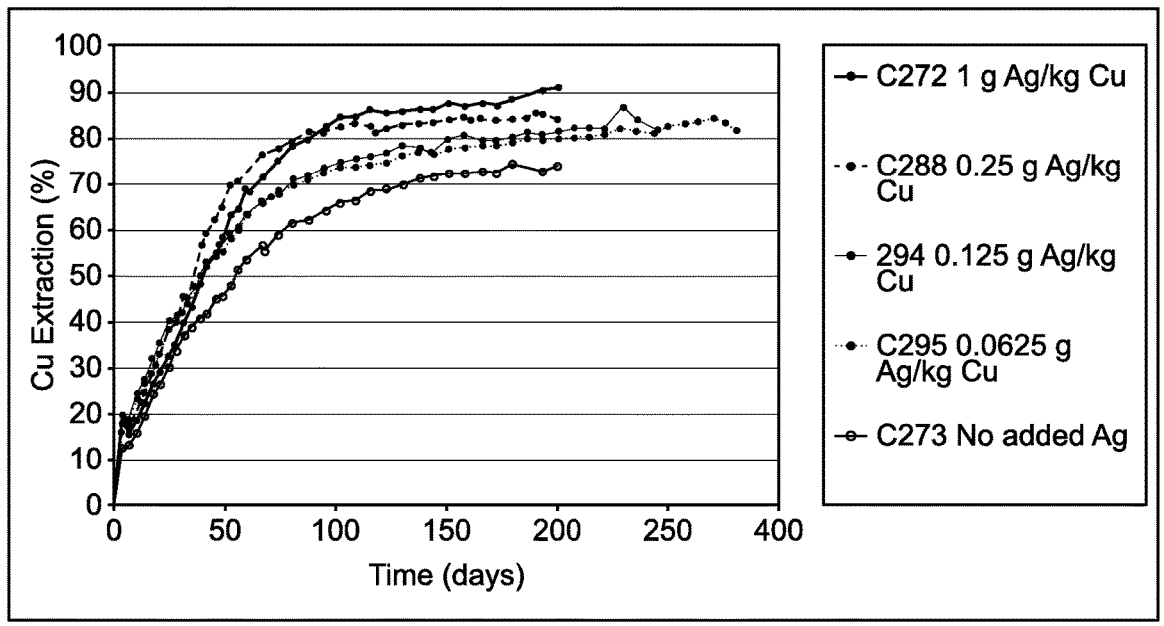
FIG. 5 is a graph of copper extraction versus leaching time for a series of column tests (columns 272, 273, 288, 294, and 295) on agglomerates of fragments of chalcopyrite ores in accordance with the invention and a comparative example illustrating the effect of varying silver dosages and a comparative example.

The following five column leach tests were carried out and the results of the leach tests are presented in FIG. 5 and summarised in Table 3:

Column 273—a control column—with no added silver in agglomerates of fragments of chalcopyrite ores.

Column 295—example of the invention—agglomerates of (a) fragments of chalcopyrite ores and (b) 0.0625 g silver added as silver nitrate solution per 1 kg copper in the ore.

Column 294—example of the invention—agglomerates of (a) fragments of chalcopyrite ores and (b) 0.125 g silver added as silver nitrate solution per 1 kg copper in the ore.

Column 288—example of the invention—agglomerates of (a) fragments of chalcopyrite ores and (b) 0.25 g silver added as silver nitrate solution per 1 kg copper in the ore.

Column 272—example of the invention—agglomerates of (a) fragments of chalcopyrite ores and (b) 1 g silver added as silver nitrate solution per 1 kg copper in the ore In FIG. 5, copper extraction with time is shown with the varying silver dosages in the five column leach tests. At all silver dosages tested, there was a significant improvement in copper extraction compared to leaching without silver.

Table 3 summarises the final copper and chalcopyrite extractions obtained from the five column leach tests.

TABLE 3

Column Test Summary for Varying Silver Dosage
Column tests conducted at $P_{80}$ 9 mm, 50° C., pH 1.2.
Chalcopyrite Extractions were determined
by Scanning Electron Microscope.

| Column # | Silver Dosage (g Ag/kg Cu) | Leach Time (days) | Cu Extraction (%) | Chalcopyrite Extraction (%) |
|---|---|---|---|---|
| C273 | 0.0 | 200 | 73.9 | 71.5 |
| C295 | 0.0625 | 280 | 81.7 | 74.7 |
| C294 | 0.125 | 244 | 81.8 | 77.3 |
| C288 | 0.25 | 200 | 84.2 | 84.3 |
| C272 | 1.0 | 200 | 91.1 | 92.6 |

2. Silver Addition Method

Figure 6:
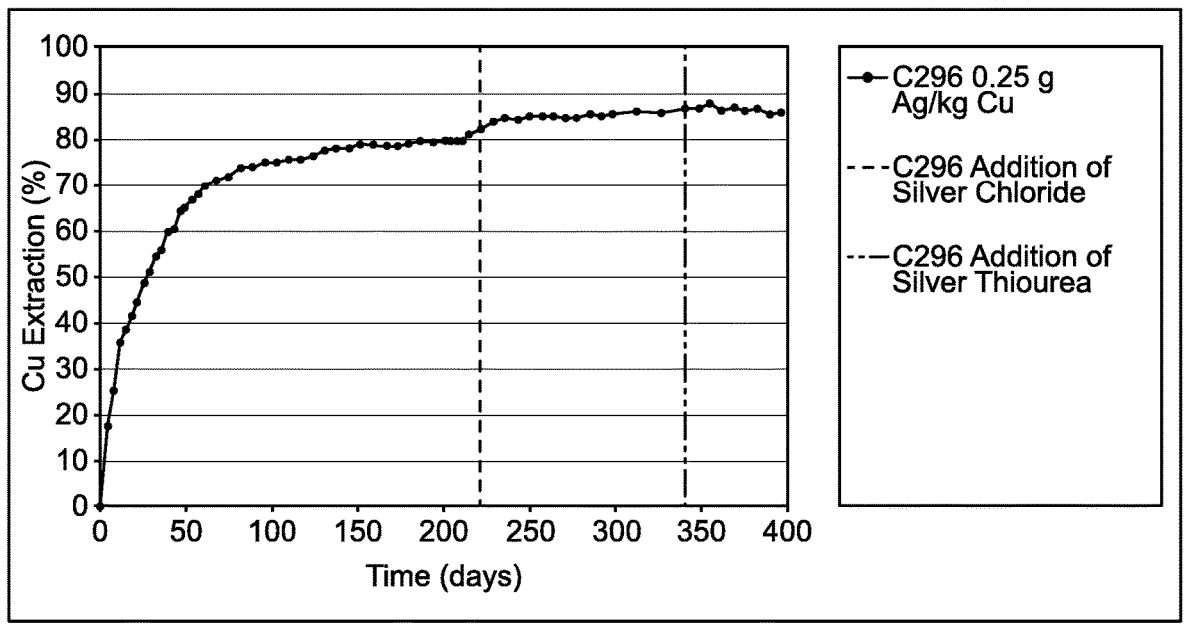
FIG. 6 is a graph of copper extraction versus leaching time for a column test (column 296) on agglomerates of fragments of chalcopyrite ores in accordance with the invention illustrating the effect of the addition of silver during the column test.

In other column tests, extra silver was added later in the leach by adding it to the irrigation solution. This was conducted first using silver chloride (0.04 g Ag/kg Cu), and later using a silver thiourea solution (0.25 g Ag/kg Cu). The results of one of these column leach tests (column 296), including details of the column, is shown in FIG. 6. This Figure shows copper extraction versus time. No increase in the copper extraction rate was observed after either addition, as shown in FIG. 6. But it does show an approximately 6% increase after the AgCl addition. This demonstrates that the application method of silver to the ore during agglomeration is far more effective than adding silver to the leach solution.

3. Effect of Other Leach Variables

Figure 7:
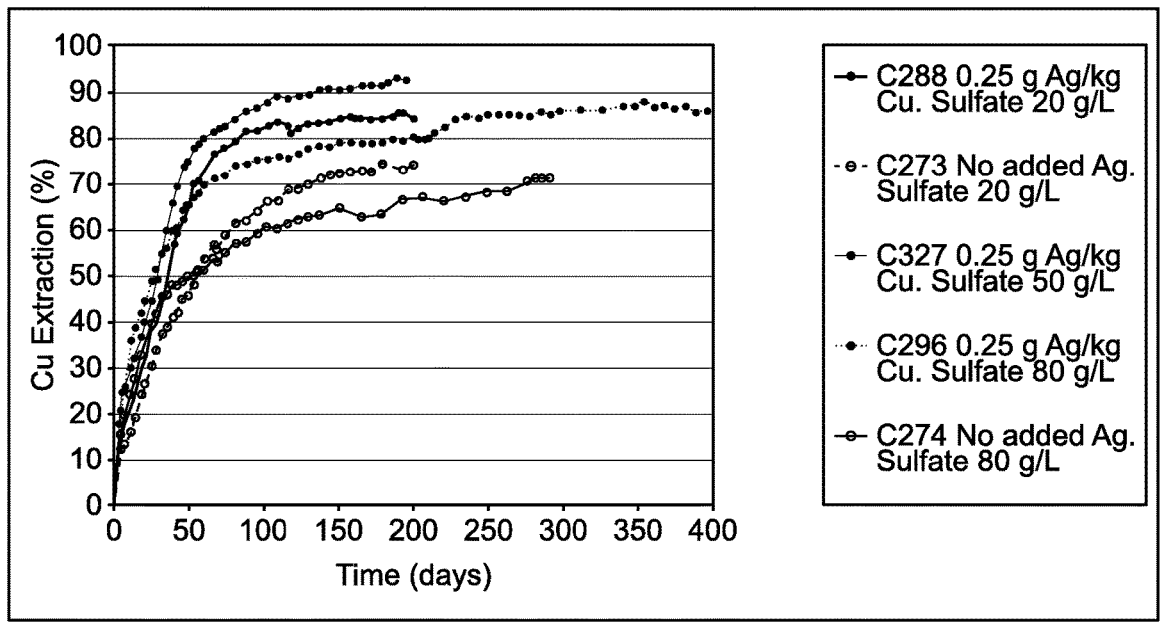
FIG. 7 is a graph of copper extraction versus leaching time for a series of column tests (columns 272, 273, 288, 294, and 295) on agglomerates of fragments of chalcopyrite ores in accordance with the invention and two comparative examples illustrating the effect of varying sulfate concentration in solution in the column tests.

In other column leach tests, the effect of sulfate concentration in solution was investigated. FIG. 7 is a graph of copper extraction versus sulfate concentration in solution in these column leach tests, with the Figure including details of the columns. In FIG. 7 it is evident that even with varying solution composition (i.e. variations in sulfate salt concentration), silver addition benefits copper extraction. It is noted that that the sulfate concentration stated is the value at the beginning of the leach. Solution collected at the base of the column contained a higher sulfate concentration due to leaching of gangue minerals, and this solution is recycled as leach liquor. The total sulfate concentration was allowed to increase to a maximum of value of 120 g/L over the course of the leach.

Figure 8:
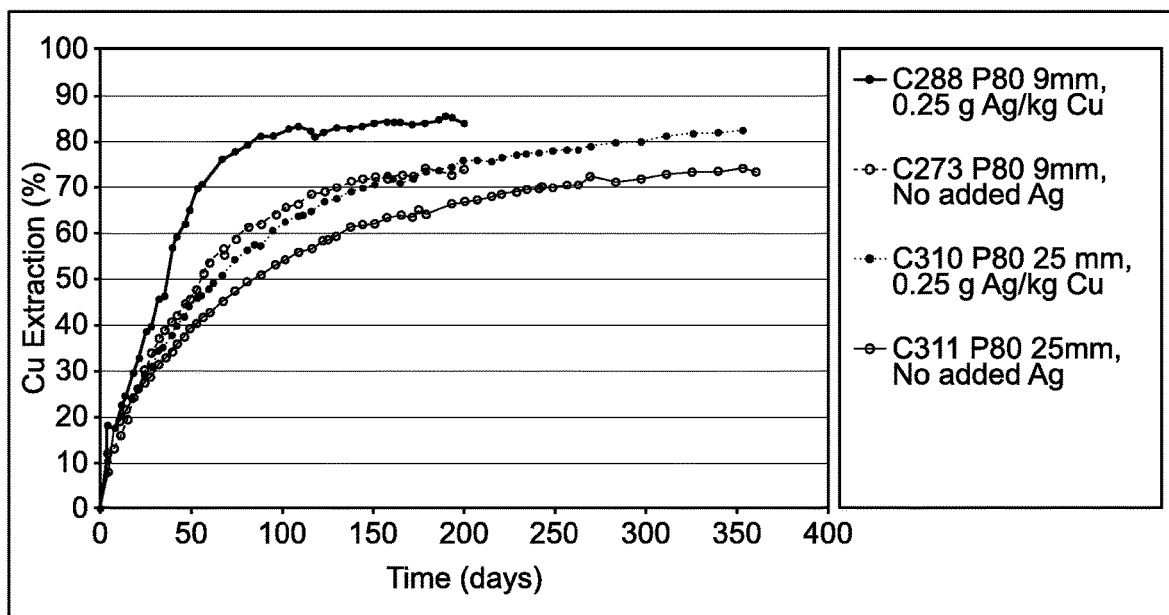
FIG. 8 is a graph of copper extraction versus leaching time for a series of column tests (columns 273, 288, 310, and 311) on agglomerates of fragments of chalcopyrite ores in accordance with the invention and two comparative examples illustrating the effect of different particle sizes in the columns.

In other column leach tests, the effect of different particle size distributions was investigated. FIG. 8 is a graph of copper extraction versus time for these column leach tests, with the Figure including details of the columns. FIG. 8 shows that silver addition benefits copper extraction from ore at different particle size distributions ($P_{80}$ of 9 mm and 25 mm).

Figure 9:
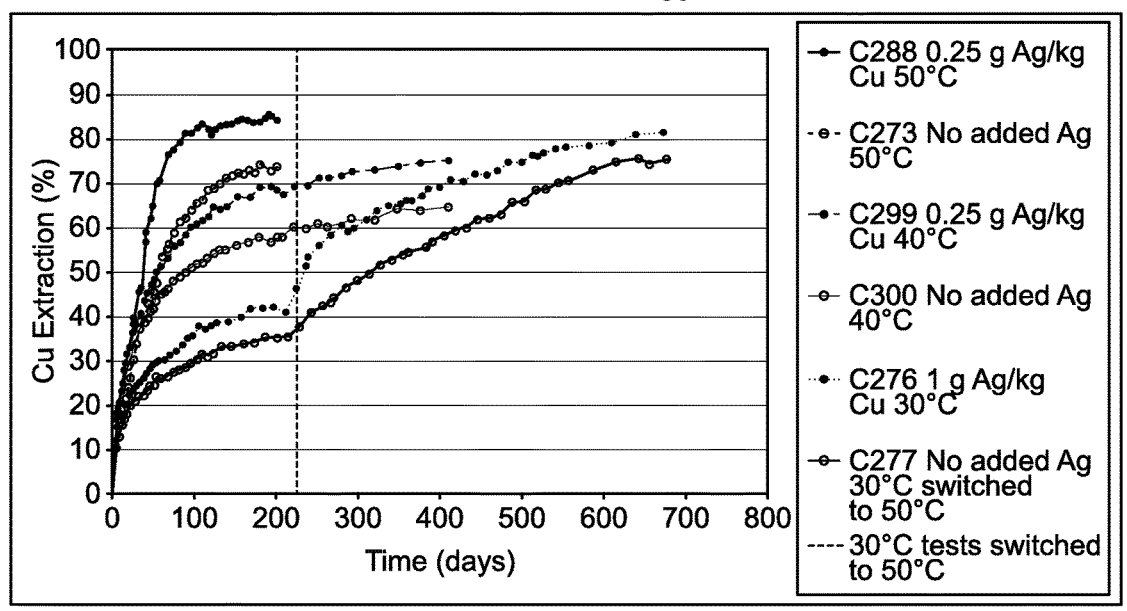
FIG. 9 is a graph of copper extraction versus leaching time for a series of column tests (columns 273, 276, 277, 288, 299, and 300) on agglomerates of fragments of chalcopyrite ores in accordance with the invention and two comparative examples illustrating the effect of silver additions at different temperatures in the columns.

In other column leach tests, the effect of temperature was investigated. FIG. 9 is a graph of copper extraction versus time for these column leach tests, with the Figure including details of the columns. FIG. 9 shows that silver addition is beneficial to copper extraction at a range of temperatures. In fact, when leaching at 40° C. with 0.25 g Ag/kg Cu, the copper extraction rate was very similar to leaching at 50° C. without silver. This shows that silver addition is an effective alternative to increasing temperature as a means of accelerating copper extraction.

Many modifications may be made to the embodiment of the present invention described above without departing from the spirit and scope of the invention.

By way of example, the embodiment is described in relation to FIG. 1 as a series of successive steps with fragments being transferred directly to the agglomeration station 3 and thereafter directly to form a heap 5. The invention is not limited to this embodiment and there may be stockpiling of agglomerates after the station 3. In addition, the station 3 and the heap 5 may not be located in the same area and it may be necessary to transport agglomerates between station 3 and heap 5 that are in different locations.

By way of further example, whilst the embodiment is described in relation to FIG. 1 in the context of mixing ore fragments and silver and forming agglomerates of ore fragments and silver and then forming heaps of the agglomerates, the invention is not so limited and extends to mixing run-of-mine ore and silver and then forming heaps from the run-of-mine ore.

By way of further example, whilst the embodiment is described in relation to FIG. 1 in the context of forming agglomerates by mixing together ore fragments and silver in the agglomeration step, the invention also extends to the following options:

(a) forming agglomerates by adding silver to ore fragments and then mixing together ore fragments in an agglomeration step; and (b) forming agglomerates of ore fragments in an agglomeration step and then adding silver to the agglomerates.

By way of further example, whilst the embodiment is described in relation to FIG. 1 in the context of forming agglomerates by mixing together ore fragments, silver, acid, and microorganisms in an agglomeration step, the invention is not limited to forming agglomerates with acid and microorganisms. In other words, acid and microorganisms are optional additions in the agglomerates.

The invention claimed is:

1. A method of leaching chalcopyrite ores includes the steps of:

(a) forming agglomerates of fragments of chalcopyrite ores and silver, defined herein as "added silver", the agglomeration step including adding silver in a solution as a spray or a mist or in a solid form as an aerosol to the chalcopyrite ore fragments while the fragments are being mixed together; and (b) leaching the agglomerates with suitable leach liquor.

2. The method defined in claim 1 wherein the agglomerates formed in the agglomeration step (a) have a low added silver concentration of less than 2 g silver per kg copper in the ore in the agglomerates.

3. The method defined in claim 1 wherein the agglomeration step (a) includes adding silver to the chalcopyrite ore fragments in the aerosol.

4. The method defined in claim 1 wherein the agglomeration step (a) includes adding silver in the mist or the spray.

5. The method defined in claim 1 wherein the agglomeration step (a) includes forming agglomerates by also mixing together an acid with the chalcopyrite ore fragments and the added silver.

6. The method defined in claim 5 wherein the acid is sulfuric acid.

7. The method defined in claim 1 wherein the agglomeration step (a) includes forming agglomerates by also mixing microorganisms that can assist leaching of copper with the chalcopyrite ore fragments and added silver.

8. The method defined in claim 1 wherein the agglomeration step (a) includes simultaneously mixing and agglomerating fragments and the added silver.

9. The method defined in claim 1 wherein the leaching step (b) is a heap leaching step.

10. The method defined in claim 9 wherein the heap leaching step (b) includes controlling the heap temperature to be less than 75° C.

11. The method defined in claim 10 wherein the heap leaching step (b) includes controlling the heap temperature to be less than 65° C.

12. The method defined in claim 10 wherein the heap leaching step (b) includes controlling the heap temperature to be less than 60° C.

13. The method defined in claim 9 includes controlling the oxidation potential of the leach liquor during an active leaching phase of the step to be less than 700 mV versus the standard hydrogen electrode in the heap leaching step (b).

14. The method defined in claim 1 wherein the agglomerates formed in the agglomeration step (a) have an added silver concentration of less than 1 g silver per kg copper in the ore in the agglomerates.

15. A method of leaching chalcopyrite ores includes the steps of:
(a) forming agglomerates of fragments of chalcopyrite ores and silver, defined herein as "added silver", wherein the agglomerates formed in the agglomeration step (a) have a low added silver concentration of less than 1 g silver per kg copper in the ore in the agglomerates; and
(b) heap leaching the agglomerates with suitable leach liquor, wherein the heap leaching step (b) includes controlling the heap temperature to be less than 75° C.

16. The method defined in claim 15 wherein the added silver concentration in the agglomerates is less than 0.5 g silver per kg copper in the ore in the agglomerates.

17. The method defined in claim 16 wherein the added silver concentration in the agglomerates is less than 0.25 g silver per kg copper in the ore in the agglomerates.

18. The method defined in claim 16 wherein the added silver concentration in the agglomerates is less than 0.125 g silver per kg copper in the ore in the agglomerates.

19. The method defined in claim 16 wherein the added silver concentration in the agglomerates is less than 0.075 g silver per kg copper in the ore in the agglomerates.

20. The method defined in claim 15 wherein the heap leaching step (b) includes controlling the heap temperature to be less than 65° C.

21. The method defined in claim 15 includes controlling the oxidation potential of the leach liquor during an active leaching phase of the step to be less than 700 mV versus the standard hydrogen electrode in the heap leaching step (b).

22. The method defined in claim 15 wherein the heap leaching step (b) includes controlling the heap temperature to be less than 60° C.

23. The method defined in claim 15 wherein the heap leaching step (b) includes controlling the heap temperature to be less than 55° C.

* * * * *